United States Patent
Tardy et al.

[11] Patent Number: 6,097,868
[45] Date of Patent: Aug. 1, 2000

[54] MULTI-CORE OPTICAL FIBER

[75] Inventors: André Tardy, Egly; Pascale Nouchi, Villebon S/Yvette; Rosine Meilleur, Saint Germain les Arpajon, all of France

[73] Assignee: Alcatel, Paris, France

[21] Appl. No.: 09/120,741

[22] Filed: Jul. 23, 1998

[30] Foreign Application Priority Data

Jul. 24, 1997 [FR] France ................................ 97 09418

[51] Int. Cl.⁷ .................................................... G02B 6/22
[52] U.S. Cl. ........................................ 385/126; 385/127
[58] Field of Search .................................... 385/123–126

[56] References Cited

U.S. PATENT DOCUMENTS

| | | | |
|---|---|---|---|
| 4,436,368 | 3/1984 | Keck | 350/96.33 |
| 5,566,196 | 10/1996 | Scifres | 372/6 |
| 5,689,578 | 11/1997 | Yamauchi et al. | 385/123 |
| 5,712,941 | 1/1998 | Imoto et al. | 385/126 |

FOREIGN PATENT DOCUMENTS

0695003 A1  1/1996  European Pat. Off. .

OTHER PUBLICATIONS

Patent Abstracts of Japan, vol. 011, No. 087 (P–557) Mar. 17, 1987 corresponding to JP 61 241705 A (Sumitomo Electric Ind Ltd) Oct. 28, 1986.
Patent Abstracts of Japan, vol. 005, No. 056 (P–057) Apr. 17, 1981 corresponding to JP 56 009707 A (Sumitomo Electric Ind Ltd) Jan. 31, 1981.
Patent Abstracts of Japan, vol. 097, No. 005 May 30, 1997 corresponding to JP 09 005539 A (Hitachi Cable Ltd; Shinetsu Chem Co LTd) Jan. 10, 1997.
Patent Abstracts of Japan, vol. 005, No. 001 (P–043) Jan. 8, 1981 corresponding to JP 55 133003 A (Furukawa Electric Co Ltd) Oct. 16, 1981.

*Primary Examiner*—John D. Lee
*Attorney, Agent, or Firm*—Sughrue, Mion, Zinn, Macpeak & Seas, PLLC

[57] ABSTRACT

The multi-core optical fiber comprises cores embedded in common cladding, with each core containing a dopant. A "peculiar" one of the cores has a central zone that is not doped by the dopant, the other cores all being completely doped by the dopant, thereby enabling the peculiar core to be used as a local reference point in order to locate the cores of the optical fiber individually.

8 Claims, 3 Drawing Sheets

FIG_1
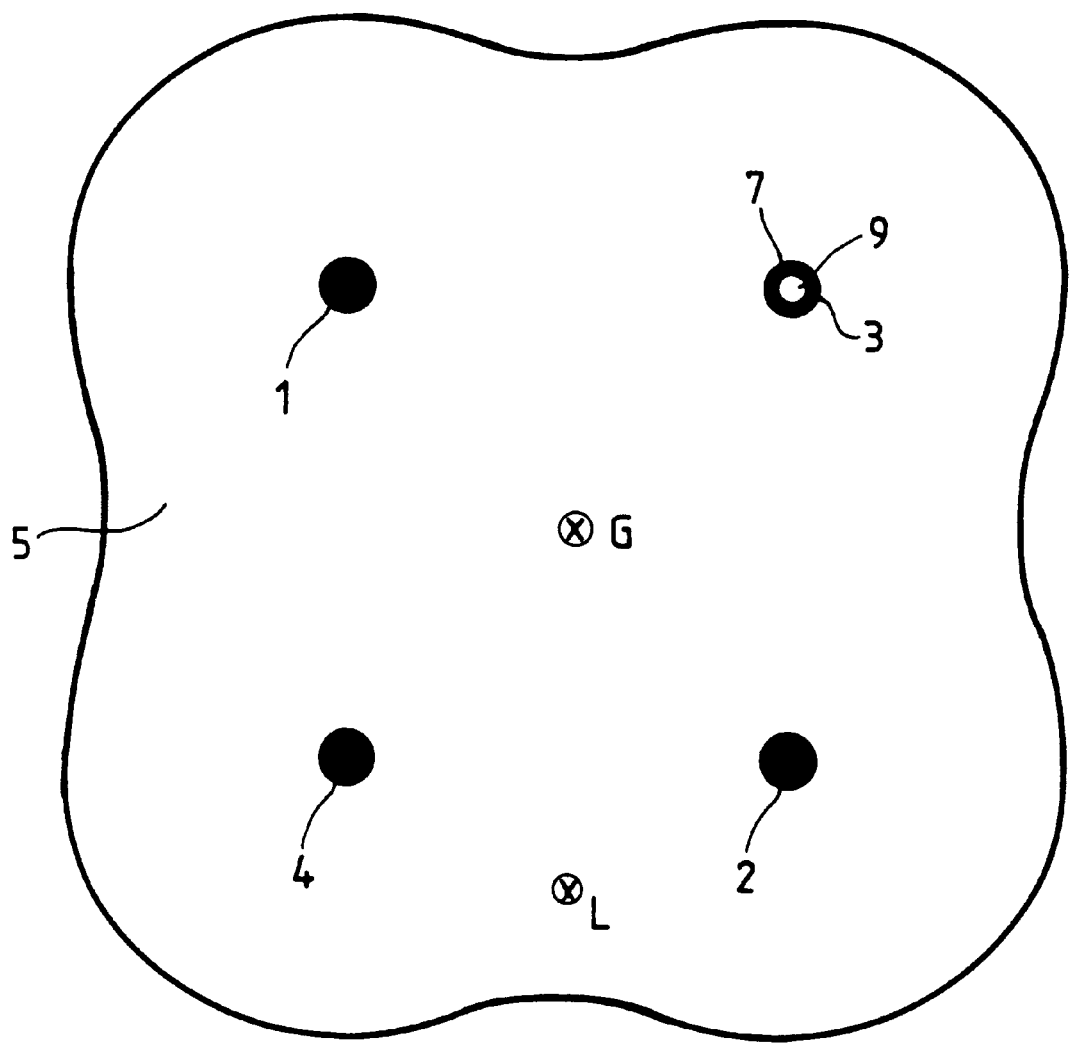

FIG_2a
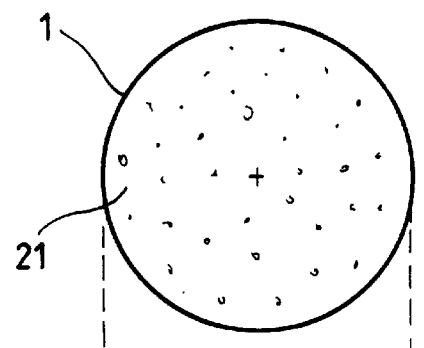
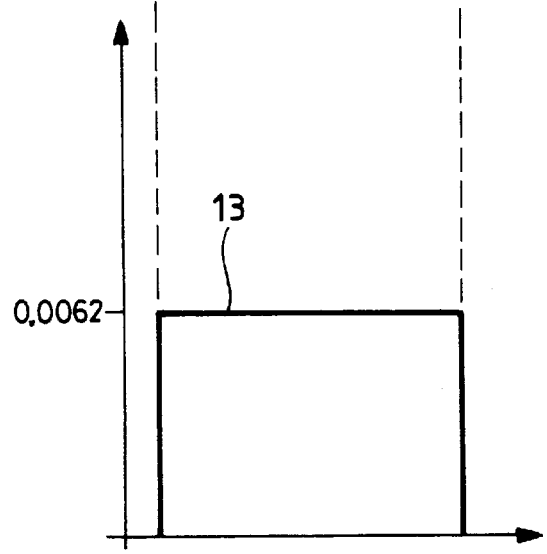
FIG_2b
FIG_3a
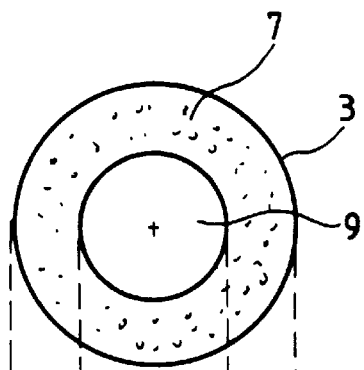
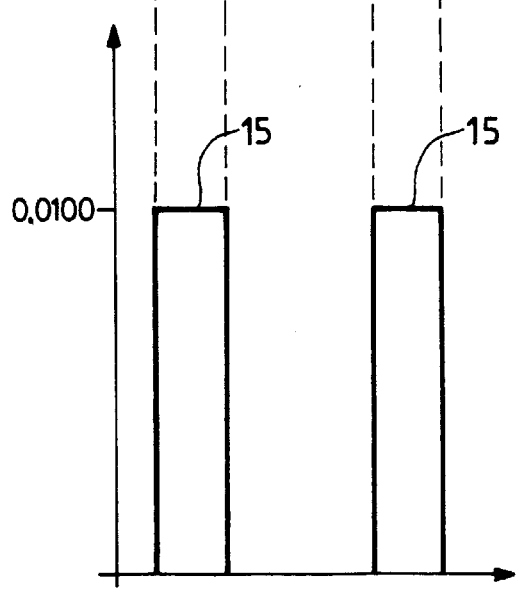
FIG_3b

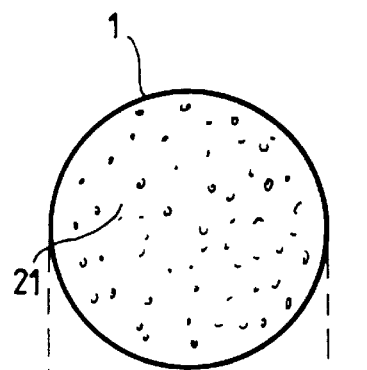
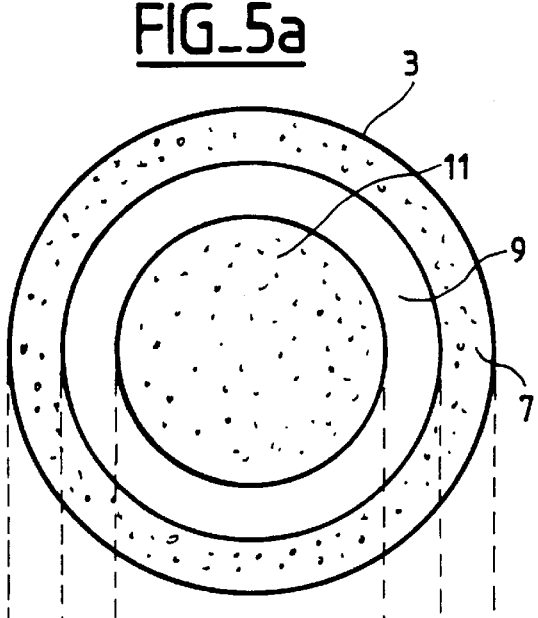
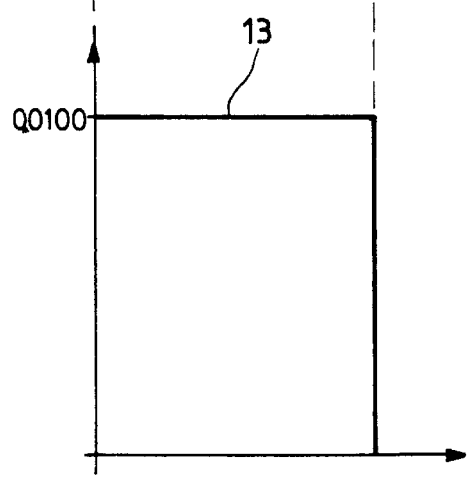
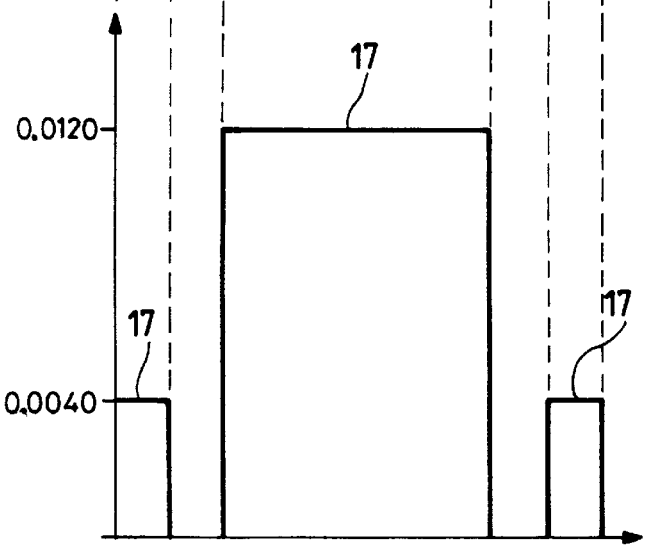

MULTI-CORE OPTICAL FIBER

The invention relates to a multi-core optical fiber comprising cores embedded in common cladding, with each core containing a dopant.

BACKGROUND OF THE INVENTION

A known example of such an optical fiber comprises cladding made of silica $SiO_2$, and cores containing a quantity of germanium oxide $GeO_2$. Such a dopant imparts a refractive index to the cores that is different from the refractive index of the cladding. In that way, each core acts as a waveguide for light so that the information transmission capacity of the multi-core optical fiber is multiplied by the number of cores it includes. The cores are generally disposed symmetrically about an axial generator line of the multi-core optical fiber.

Connecting multi-core optical fibers is more fiddly than connecting single-core fibers. It is necessary to locate the cores individually in a connection plane that is perpendicular to the optical fiber so as to prevent any risk of erroneous interconnection. The symmetrical disposition of the cores is not sufficient to locate them individually.

One solution consists in marking the multi-core optical fiber during its manufacture. A coating of plastics material is disposed around the optical fiber, and then marked with a colored groove using an ink. That type of marking requires high accuracy, given the diameter of the multi-core optical fiber, and runs the risk of degrading the mechanical strength of the optical fiber. The manufacturing method must also include a step dedicated to locating the cores.

In a solution known from document FR-2 736 441 A1, the multi-core optical fiber is surrounded by a ring whose outer edges reproduce, in geometrically similar manner, the edges of the optical fiber. A colored mark is made on one of the outer edges of the ring for location purposes. It should be observed that that solution is not applicable to multi-core optical fibers of circular section. Once again, a step of the manufacturing method must be dedicated to locating the cores.

Another solution consists in giving a reference role to one of the cores of the optical fiber, by giving it an optogeometric property that is different from that of the other cores.

An example of such a solution is given by a multi-core optical fiber in which dopant is absent from one of the cores. Observing a connection plane under a microscope enables all the cores to be seen apart from the non-doped core, since it is the dopant which gives rise to contrast between the cores and the cladding which results from the difference between the refractive indices. The symmetrical disposition of the cores in the connection plane is thus broken by the non-doped core which provides a local reference point. The non-doped core is, however, no longer used for transmitting information and reduces the capacity of the optical fiber.

In another solution, the dopant for one of the cores is distributed over a section that is much smaller or much larger than the section of the other cores of the optical fiber, in order to provide a local reference point. However the difference in diameter of the sections is such that the core of much smaller or much larger section is not used for transmitting information, resulting once again in the capacity of the multi-core optical fiber being reduced.

OBJECT AND SUMMARY OF THE INVENTION

The object of the invention is to provide a multi-core optical fiber in which the cores can be individually located, in simple manner, and in any connection plane, without reducing transmission capacity.

To this end, the invention provides a multi-core optical fiber comprising cores embedded in common cladding, with each core containing a dopant, wherein a "peculiar" one of the cores has an inner zone having a dopant concentration that is different from that of the rest of said peculiar core and from that of the other cores, said other cores all being completely doped by said dopant.

When observing a connection plane, the cores other than the peculiar core form a mark, e.g. a dark mark, in contrast with the cladding, while the peculiar core presents a clear inner zone surrounded by a dark zone. As a result, the peculiar core is used as a local reference point for the connection plane in order to locate the cores of the optical fiber individually.

The dopant is uniformly distributed in the peculiar core and in each of the other cores in order to create a ring-type refractive index profile in the peculiar core and of step-type refractive index profile in the other cores. Advantageously, having a quantity of dopant for the peculiar core that is different from the other cores imparts, both to the ring profile of the peculiar core and to the step profile of the other cores, a mode in which the spatial extent of the light energy is substantially the same, or a mode diameter that is substantially equal. In this manner, the peculiar core is used in the same way as the other cores for transmitting information in the multi-core optical fiber.

In a multi-core optical fiber of the invention, the peculiar core thus serves both as a local reference point for the connection plane and as a waveguide.

BRIEF DESCRIPTION OF THE DRAWINGS

Other characteristics and advantages of the invention appear on reading the description as illustrated by the drawings:

FIG. 1 shows, in cross-section, a multi-core optical fiber of the invention having four cores;

FIGS. 2a and 3a respectively show, in cross-section, a non-peculiar core and a peculiar core of a first embodiment of the invention;

FIGS. 2b and 3b respectively show a step-type refractive index profile and a ring-type refractive index profile of the first embodiment of the invention;

FIGS. 4a and 5a respectively show, in cross-section, a non-peculiar core and a peculiar core of a second embodiment of the invention; and FIGS. 4b and 5b respectively show a step-type refractive index profile and a ring-type refractive index profile with step of the second embodiment of the invention.

MORE DETAILED DESCRIPTION

A multi-core optical fiber of the invention comprises common cladding and cores, each of which cores contains a dopant. The number of cores provided is at least equal to two.

FIG. 1 shows the cladding 5 and four cores 1 to 4 in cross-section on a plane perpendicular to a longitudinal direction L of the optical fiber. The cores extend parallel to the longitudinal direction L. They are of circular section and they are disposed symmetrically about an axis G of the optical fiber. The multi-core optical fiber is of approximately circular section having an average diameter equal to 140 µm. The short distance between two cores is equal to 52 µm.

The cladding is constituted by silica $SiO_2$. The cores contain germanium oxide $GeO_2$ as dopant for the silica so as to create a refractive index that is different from that of the cladding.

One of the cores 3, referred to as a "peculiar core", has a central inner zone 9 that has not been doped by the dopant, and which is constituted by a material that is identical to that of the cladding 5, for example. For the peculiar core 3, the dopant is distributed in a tubular zone 7 surrounding the central inner zone 9.

For cores 1, 2, and 4, the dopant is distributed throughout the entire core. Distribution of the dopant is symbolized by specks which, in FIG. 2a, cover a solid section 21 of the core 1, and which, in FIG. 3a, cover the tubular zone 7 of the peculiar core 3.

Observation of a connection plane perpendicular to the longitudinal direction of the multi-core optical fiber is performed by coupling light inside the optical fiber, e.g. by transversely illuminating the cladding that is covered locally in a diffusing material, and by displaying, under a microscope, an annular zone, e.g. a dark zone corresponding to the tubular zone 7, with a clear central zone corresponding to the central inner zone 9, and three solid dark marks, corresponding respectively to the peculiar core 3 and the cores 1, 2, and 4.

The dopant is preferably distributed uniformly in the tubular zone 7 of the peculiar core 3 and in the cores 1, 2, and 4. This results, in FIGS. 2b and 3b respectively, in a refractive index profile of the step type 13 for any one of the non-peculiar cores 1, 2, and 4, e.g. core 1, and of the ring type 15 for the peculiar core 3.

Advantageously, having a quantity of dopant for the peculiar core that is different from the other cores imparts, both to the ring profile of the peculiar core and to the step profile of the other cores, a mode in which the spatial extent of the light energy is substantially the same, or a mode diameter that is substantially equal.

By way of example, in the peculiar core 3, the germanium oxide is introduced uniformly into the silica at a concentration of 9%±0.5% so as to impart a constant refractive index difference of 0.01 relative to the cladding in the tubular zone 7 which is of outside diameter equal to 6.5 $\mu$m and of inside diameter equal to 3.25 $\mu$m. The other cores 1, 2, and 4 contain dopant at a uniform concentration lying in the range 5.5% to 6% which imparts a constant refractive index difference of 0.0062 thereto in their section of diameter equal to 7.35 $\mu$m. The mode diameter for all four cores lies in the range 8 $\mu$m to 8.5 $\mu$m, so all four of them can be used equally for transmitting information via the multi-core optical fiber. The peculiar core thus serves both to locate the other cores of the optical fiber individually, and as a waveguide for transmitting information.

In another embodiment of the invention, shown in FIG. 5a, the peculiar core 3 includes a central zone 11 that is completely doped by the dopant, inside an inner tubular zone 9 that is not doped by the dopant, and which is itself surrounded by the tubular zone 7 that is completely doped by the dopant. For the other cores 1, 2, and 4, e.g. core 1 in FIG. 4a, the dopant is distributed throughout the entire core.

Observation of a connection plane perpendicular to the longitudinal direction L of the multi-core optical fiber is performed in the same manner as described above by displaying, under a microscope, firstly the peculiar core 3 as a dark annular zone corresponding to the tubular zone 7, surrounding a clear annular zone corresponding to the inner tubular zone 9 which, itself, surrounds a solid dark mark corresponding to the central zone 11, and secondly solid dark marks which correspond to the cores 1, 2, and 4.

The dopant is, once again, preferably distributed uniformly in the tubular zone 7 and in the core 11 of the peculiar core 3 and also in the other cores 1, 2, and 4. This results, in FIGS. 4b and 5b respectively, in a refractive index profile of the ring type with a step 17 for the peculiar core 3, and of the step type 13 for each of the other cores, e.g. core 1.

Conserving mode diameter between the peculiar core and the other cores is achieved by a different quantity of dopant. Once again, by way of example, the germanium oxide is introduced uniformly into the tubular zone 7 of the peculiar core 3 at a concentration of 3.5% to 4% relative to the silica so as to impart to the tubular zone, a constant refractive index difference of 0.004 relative to the cladding; the tubular zone 7 has an outside diameter equal to 15 $\mu$m and an inside diameter equal to 11 $\mu$m. The germanium oxide is introduced to the central zone 11 of diameter equal to 7 $\mu$m at a concentration of 11%±0.5% so as to impart a constant refractive index difference of 0.012 thereto. The other cores 1, 2, and 4 uniformly contain dopant at a concentration lying in the range 9% to 9.5% which imparts a constant refractive index difference of 0.0100 thereto in their section of diameter equal to 7.2 $\mu$m.

The mode diameter thus lies in the range 8 $\mu$m to 8.5 $\mu$m.

The multi-core optical fiber of the invention is manufactured from a plurality of single-core optical fiber preforms which are disposed symmetrically around a central rod made of silica, and they are assembled thereto by welding along all or part of their tangency lines during a fiber-drawing operation. To obtain a homogeneous multi-core optical fiber, a vacuum is established either before or during fiber drawing by means of a blind tube welded at one end and communicating with pumping means via a tubular orifice.

In known manner, determined quantities of dopant is introduced during various stages of manufacture of each single-core optical fiber preform, so as to impart a refractive index profile to the core relative to the cladding which is a step profile, a ring profile, or even a ring and step profile.

In the invention, concentration of the dopant in the inner zone can either be substantially zero, or can be different from that of the remainder of the peculiar core and from that of the other cores, all of said other cores being completely doped by the dopant.

What is claimed is:

1. A multi-core optical fiber comprising cores embedded in common cladding, with each core containing a dopant, wherein a peculiar one of the cores has an inner zone having a dopant concentration that is different from that of the rest of said peculiar core and from that of the other cores, said other cores all being completely doped by said dopant, in which said inner zone is central to said peculiar core and is surrounded by a tubular zone that is completely doped by said dopant.

2. An optical fiber according to claim 1, wherein said inner zone contains substantially no dopant.

3. An optical fiber according to claim 1, in which the dopant is distributed uniformly in the tubular zone of the peculiar core and in each of the other cores in different quantities so as to impart respectively to the peculiar core and to the other cores a ring-type refractive index profile and a step-type refractive index profile having substantially the same mode diameter.

4. A multi-core optical fiber comprising cores embedded in common cladding, with each core containing a dopant, wherein a peculiar one of the cores has an inner zone having a dopant concentration that is different from that of the rest of said peculiar core and from that of the other cores, said other cores all being completely doped by said dopant, said peculiar core includes a central zone that is completely doped by the dopant, and is surrounded by said inner zone which is tubular and which is itself surrounded by a tubular zone that is completely doped by said dopant.

5. An optical fiber according to claims 4 in which the dopant is distributed uniformly in the tubular zone of the peculiar core and in each of the other cores in different quantities so as to impart respectively to the peculiar core and to the other cores a ring-type refractive index profile with step and a step-type refractive index profile having substantially the same mode diameter.

6. An optical fiber according to claim 4 wherein said inner zone contains substantially no dopant.

7. An optical fiber according to claim 4, in which the dopant is distributed uniformly in the central zone of the peculiar core and in each of the other cores in different quantities so as to impart respectively to the peculiar core and the other cores a ring-type refractive index profile with step and a step-type refractive index profile having substantially the same mode diameter.

8. An optical fiber according to claim 4, in which the dopant is distributed uniformly in the central zone and in the tubular zone of the peculiar core and in each of the other cores in different quantities so as to impart respectively to the peculiar core and the other cores a ring-type refractive index profile with step and a step-type refractive index profile having substantially the same mode diameter.

* * * * *